Patented Jan. 9, 1951

2,537,520

UNITED STATES PATENT OFFICE 2,537,520

MATERIAL SIMULATING CERAMIC WALL TILE

Ernst Eger, Los Angeles, Calif., assignor to United States Rubber Company, New York, N. Y., a corporation of New Jersey No Drawing. Application April 29, 1948, Serial No. 24,101

3 Claims. (Cl. 260—40)

This invention relates to a material simulating ceramic wall tile and particularly to plastic wall tile or panelling made from a selected resin and a selected filler which cooperate to give new and unusual results. At present plastic wall tile adapted to be used where ceramic wall tile might normally be used is largely made from pigmented polystyrene resin. However, the production is expensive by reason of the necessity for using costly high-pressure forming equipment. Furthermore, there is a serious shortage of polystyrene and the resulting tiling suffers from various drawbacks including shrinkage and warping during and subsequent to manufacture, high cost of production, and the necessity for using solvent-containing organic adhesives to secure the tiles to the backing material which is objectionable in that the adhesive is apt to show through or strike through the tiles and involves the necessity for evaporation of the volatile solvent which is slow because the adhesive is shut off by the tile from contact with the air.

I have attempted to make a plastic wall tile or the like from a pigmented resin of the so-called polyester type, i. e., a substantially 100% polymerizable mix of a liquid dihydric alcohol ester of an ethylene alpha-beta-dicarboxylic acid and a liquid monomeric unsaturated polymerizable compound in which the unsaturation is due to a single terminal ethylenic group which is attached to a negative radical and in which the ester aforesaid is soluble and with which it is copolymerizable in the presence of a peroxy polymerization catalyst, by mixing such a resin with the pigment in pigmenting proportions and with a peroxy polymerization catalyst typified by benzoyl peroxide, shaping the resulting mixture as by casting and effecting polymerization of the resin by heating to a suitable elevated temperature, say from 180° to 250° F. However, the resulting material was not suitable for wall-tiling for various reasons among which were the presence of air bubbles, excessive shrinkage during manufacture, the development of unequal temperatures during manufacture which prevents the casting of large areas, the development of strains during polymerization, deficient impact- and shatter-resistance, undue softness, and excessive cost. I have attempted to overcome these disadvantages by using various common fillers such as clay and diatomaceous earth in conjunction with the polymerizable resin mix but the results have not been satisfactory. I have also tried magnesium oxide and magnesium carbonate but they are not satisfactory.

I have unexpectedly found that the above-noted disadvantages can be completely overcome by the use of from 30 to 60% by weight of finely divided calcium carbonate at least 90% of which is of a particle size not exceeding 35 microns as a filler with correspondingly from 70 to 40% of the polymerizable mix of an acidic liquid dihydric alcohol ester of an ethylene alpha-beta-dicarboxylic acid and the liquid monomeric unsaturated compound having a single terminal ethylenic group attached to a negative radical. By shaping and heating a mixture of this type, also containing a conventional peroxy polymerization catalyst and, if desired, a suitable proportion of pigment or other coloring material, there is produced an article closely simulating ceramic wall tile and useable particularly as wall tile or panelling. The proportions of the calcium carbonate and the resin mix are critical. I have found that the impact- and shatter-resistance of the mixture reach a maximum when the indicated relative proportions of resin mix and calcium carbonate of the specified particle size are employed and that tiles cannot satisfactorily be made with proportions outside the indicated range. In fact the optimum shatter-resistance is attained when the proportion of the calcium carbonate ranges from 40 to 50% by weight and the proportion of the resin mix correspondingly ranges from 60 to 50% and use of these relative proportions is preferred. Where reference is made herein to the percentage of resin mix or of calcium carbonate, the percentages are based on the sum of the weights of the resin and the calcium carbonate. The mixture and the product of my invention consist essentially and generally solely of the resin and the calcium carbonate, with or without a small amount (usually not over 15% by weight of the resin mix and the calcium carbonate) of pigmenting or coloring material.

Typical polyester-copolymerizable monomer resin mixes used in practicing my invention are described in U. S. Patent to Ellis 2,255,313 and in British Patents 540,168 and 540,169. These resins are often composed of from 50 to 85 per cent of an acidic linear polyester of a dicarboxylic acid, especially maleic or fumaric acid or anhydride, with a glycol, typified by diethylene glycol maleate and ethylene glycol maleate and correspondingly from 50 to 15% of the liquid monomeric unsaturated copolymerizable material typified by styrene, vinyl acetate and diallyl phthalate. As explained in the Ellis patent, the unsaturated dicarboxylic acid may be partially replaced by another dibasic acid which may be typified by adipic acid, succinic acid, sebacic acid, phthalic acid, tetrachlorophthalic anhydride, and which may be used in amounts up to 3 moles per mole of unsaturated dicarboxylic acid. In practice, substantially equivalent proportions of the glycol and the unsaturated dicarboxylic acid (or the mixture of unsaturated dicarboxylic acid and other dibasic acid) are employed, i. e., they are used in such proportions that there is present in the mixture undergoing esterification substantially one carboxyl group in the dicarboxylic acid or acids to one hydroxyl group in the glycol, and the esterification is carried to an advanced stage but short of complete insolubility and infusibility. The resulting esterification product has high molecular weight and is completely soluble in the liquid monomeric unsaturated polymerizable compound containing the terminal ethylenic group.

In making the linear polyester component of the resin, it is important that the esterification of the glycol with the dicarboxylic acid or acids be carried only to such an extent that the resulting esterification product (alkyd) has an acid number in the range of from 25 to 100 and preferably in the range of from 25 to 50. The acid number of such alkyds is discussed in an article by Bradley et al., Ind. Eng. Chem. 29, 1270–1276 (1937). Although I do not wish to be limited to any particular theory, it is believed that the outstanding results of the present invention are attributable in part to a chemical interaction between the acidic resin and the surface of the calcium carbonate particles which greatly enhances the bond and which operates in conjunction with the polymerization of the resin to give an unusually strong, impact-resistant material.

A typical resin mix used in practicing my invention is one composed of diethylene glycol maleate polyester made by reacting 41 parts of diethylene glycol with 36 parts of maleic anhydride to give a product having an acid number of 30 dissolved in 30 parts of styrene. Another is composed of the reaction product of 42 parts of diethylene glycol, 20 parts of maleic anhydride and 22 parts of succinic acid (reacted to an acid number in the range of 25 to 50) dissolved in 26 parts of styrene. Another is made by dissolving the esterification product of 30 parts of diethylene glycol and 27 parts of maleic anhydride (reacted to an acid number of from 25 to 50) in 48 parts of diallyl phthalate.

In formulating the resin, I may use any alpha-substituted ethylene compounds having a single terminal $CH_2=C<$ group attached to a negative radical and in which the ester is soluble and with which it is copolymerizable, these compounds being typified by those set forth in Ellis U. S. Patent 2,255,313 and in British Patents 540,168 and 540,169.

The calcium carbonate employed in the practice of my invention is preferably substantially pure, i. e. at least 97% $CaCO_3$. While I may use synthetically prepared calcium carbonate, e. g., precipitated chalk, in the practice of my invention, I often prefer to use calcium carbonate obtained by grinding naturally occurring dense, crystalline mineral calcium carbonate (calcite) having a specific gravity of approximately 2.7 to a particle size such that at least 90% of the particles do not exceed 35 microns in diameter. While I may use calcium carbonate substantially all particles of which are of substantially a given size not over 35 microns, I prefer to use a material having a particle size distribution, such that it contains particles of widely varying size, e. g., a material whose particles approximate a normal distribution curve.

For example, I may use ground calcite having a surface mean particle diameter of less than 0.7 micron and a weight mean particle diameter of 2.5 microns, the particles of which approximate a normal distribution curve with a median size of 3.8 microns, there also being present a small amount of material with particles around 8 microns in size, such material being sold commercially under the trade-name "Atomite." I obtain even better results with a coarser form of such ground calcite sold commercially under the trade-name "Albacar" and having an average particle size ranging from 10 to 25 microns; this coarser material is considerably cheaper than the finer grade mentioned above and gives a product having a 24% improvement in shatter-resistance over that obtained with the finer grade; it also gives a lighter mixture which enables a reduction in the amount of coloring material where colored tiles are desired, and enables a reduction in the amount of titanium dioxide preferably used where white or light-colored tiles are desired.

Use of the specified proportions of calcium carbonate of the specified size greatly increases the hardness and shatter-resistance of the resin, markedly reduces polymerization strains which enables sheets of large area to be formed, greatly decreases shrinkage and permits higher loading than any other filler which I have attempted to use while still permitting the resulting mixture to flow so that it can be cast and thus readily shaped to the desired configuration without use of expensive high-pressure equipment. As pointed out above I can use successfully as high as 60% loading. The calcium carbonate does not retard polymerization but rather has a tendency to shorten same. It equalizes temperatures thus permitting the successful casting of large areas. Also it permits the use of ordinary "ceramic cement" (i. e. ordinary tile-setting cement commonly used for the setting of ceramic wall tile and which is believed to be composed mainly of plaster of Paris) or other inorganic binder which in use is mixed with water, e. g., Portland cement, sodium silicate, etc. as the adhesive for securing the tiles or panels made by my invention to an inorganic background such as concrete, mortar, plaster, gypsum or brick; this result is achieved without need for roughening the rear surface of the product or providing a special matte surface. On the other hand ordinary organic-base solvent-containing commercial adhesives for plastic tiles can also be used if the tile is to be adhered to plywood, wall boards made out of various organic fibers or metal walls. Use of my invention also greatly reduces the presence of air bubbles which would be a serious problem if the calcium carbonate were not used. In addition the production of finished tiles or panels from the mixture of my invention involves very simple labor and equipment requirements.

In making tiles or panels, I simply form an intimate physical mixture of the above-described resin mix, the calcium carbonate and a peroxy polymerization catalyst. The ingredients may be mixed in any suitable type of mixer. The resulting mixture which is pourable and viscous, is then poured into a form, the bottom face of which may have a polished, smooth surface in order that the resulting tile may have a highly polished smooth face on the side which is to be exposed to view upon final placement (or any other type of surface where an embossed or grained face is desired), and levelled out in the form in any suitable manner whereupon the material is heated to a suitably elevated temperature, say 180° to 250° F. until polymerization of the resin is substantially or entirely complete. Generally no pressure is applied during the polymerization step. I prefer to exclude air from the mixture while it is undergoing polymerization by covering the surface with a suitable air-impervious covering.

The selection of a suitable type and amount of polymerization catalyst is well within the present-day skill of the art and does not per se constitute any part of my invention. I generally use benzoyl peroxide but may use any known peroxy polymerization catalyst such as tertiary butyl hydroperoxide, acetyl benzoyl peroxide, etc. The amount of peroxy catalyst will usually be within the range of from 0.1 to 5% by weight of the resin.

Shaping of the mix of resin, filler and catalyst should be effected before gelling of the resin is initiated.

A marked advantage of my invention is the simple equipment required to produce the finished tiles or panels in contrast to the elaborate high pressure equipment required to produce other plastic tiles. Another advantage is that since the resin is 100% polymerizable and does not depend for resinification upon the evolution of any volatile material, no difficulty is experienced as a result of liberation of gaseous or volatile by-products. The setting of the resin mix takes place by a simple additive reaction and the binder in the resulting hardened material can be designated as the additive reaction product of a substantially neutral unsaturated monomeric material with a polyester of an aliphatic dihydric alcohol and an unsaturated aliphatic dicarboxylic acid.

If a pigmented wall tile or panel is desired, suitable amounts of pigmenting materials are incorporated during the preparation of the initial mixture. Usually, the amount of pigment will not exceed 15% by weight based on the weight of ground calcium carbonate and the resin. In many cases, as little as ½ to 1% is sufficient. The product of my invention can be made in any of the usual colors. In making pure white tiles and in making tiles of certain colors, especially the light colors such as pink, light blue, etc., I prefer to incorporate in the formulation titanium dioxide in an amount ranging from 5 to 10% by weight based on the weight of the calcium carbonate and the resin. In the case of light colored tiles this amount of titanium dioxide is incorporated in addition to the colored pigment and may be considered to be part of the pigment. Since the amount of pigment (including titanium dioxide where it is used) is usually small relative to the amount of the calcium carbonate filler, its particle size is not particularly important. The pigments usually are of particle size such that at least 99 percent passes through a 325 mesh screen and generally are of a size smaller than 35 microns. Ordinary commercial titanium dioxide is composed mainly of particles about 0.16 micron in diameter. The average particle size of red and blue pigment pastes is from 0.3 to 0.5 microns.

The following example illustrates the preparation of pink tile in accordance with my invention:

*Example 1*

The following ingredients are mixed intimately together:

100 parts by weight of a composition composed of the reaction product of 18 parts ethylene glycol, 14 parts maleic anhydride and 42 parts tetrachlorophthalic anhydride (reacted to an acid number of from 35 to 50) dissolved in 18 parts of styrene and admixed with 17 parts of tricresyl phosphate.

100 parts of a ground naturally occurring calcium carbonate having a surface mean particle diameter of less than 0.7 micron and a weight mean particle diameter of 2.5 microns, the size approximating a normal distribution curve with a median size of 3.8 microns (sold commercially as "Atomite").

1 part of red pigment.

½ part benzoyl peroxide (polymerization catalyst).

The resulting mixture is cast into the desired shapes which are cured by heating under no pressure or light pressure at 250° F. The pink tiles produced are completely satisfactory in every respect.

*Effect of varying proportions*

In order to demonstrate the effect of varying the relative proportions of the calcium carbonate and the resin, a series of formulations of resin and calcium carbonate identical with those used in the above example, and also containing ½% of benzoyl peroxide based on the resin, were prepared and were tested for impact- and shatter-resistance by a method which was adapted from the Army Air Forces "Falling Ball Impact Test," Method No. 1074, Specification L-P-406a. A steel ball weighing 1 ounce is used for the tests. The ball was dropped from successively increasing heights in 1 inch intervals, starting at a height of 4 inches, until the specimen broke. Following are the results of the tests.

| Parts Ground Calcium Carbonate (As used in Example 1) | Parts of Resin (As used in Example 1) | Height in Inches of Drop Before Breakage |
|---|---|---|
| 30 | 70 | 9 |
| 40 | 60 | 9.6 |
| 50 | 50 | 9.5 |
| 60 | 40 | 8.5 |

From the tests it will be seen that the impact resistance of the material reached a maximum at a proportion of from 40 to 50% by weight of the calcium carbonate and correspondingly from 60 to 50% by weight of the resin.

Usually materials of the present invention are produced with a smooth surface. In a modification of my invention, however, I may place bibulous paper such as that used for making paper towels on one or both sides of the material in the form. For example, I may place such paper in the bottom of the form, pour the mix into the form, place another sheet of paper on the top of the mix and cure by heat and light pressure as before. I have found that a small amount of the resin penetrates the paper and binds it securely to the hardened core, giving a rough finish which may be desirable for some uses.

Tiles or panels may be produced with an embossed effect by using a figured metallic plate as the bottom of the form.

From the foregoing description it will be seen that the present invention provides a simple and economical method of making material which closely simulates ceramic wall tile. The material made by my invention is cheaper than ceramic wall tile and is superior thereto in many other respects. It can be readily cut in distinction to the great difficulty of cutting ceramic wall tile. The tiles of my invention are completely free from tendency to shrink during their life and have very adequate abrasion and scratch resistance. Many other advantages of the present invention will appear to those skilled in the art.

Having thus described my invention, what I claim and desire to protect by Letters Patent is:

1. Plastic wall tile which closely simulates ceramic wall tile and which results from setting by polymerization of an intimate mixture of a polymerizable mix consisting of an ester resulting from the reaction of ethylene glycol with approximately equal molar proportions of maleic anhydride and tetrachlorophthalic anhydride, there being present in the mixture which is esterified substantially one acid equivalent presented by said anhydrides per hydroxyl group presented by said glycol, the esterification being continued to an advanced stage such that the resulting esterification product has an acid number in the range of from 25 to 50, and styrene, the relative proportions of said ester and said styrene ranging from 50 to 85% of said ester and correspondingly from 50 to 15% of said styrene, these proportions being by weight based on the sum of the weights of said ester and said styrene, with calcium carbonate having a particle size such that at least 90% does not exceed 35 microns, the relative proportions of said calcium carbonate and said polymerizable mix ranging from 30 to 60% by weight of said calcium carbonate and correspondingly from 70 to 40% by weight of said polymerizable mix, and a peroxy polymerization catalyst.

2. Plastic wall tile as set forth in claim 1 wherein said polymerizable mix consists of the reaction product of approximately 18 parts ethylene glycol, 14 parts maleic anhydride and 42 parts tetrachlorophthalic anhydride reacted to an acid number of from 35 to 50 dissolved in about 18 parts of styrene and admixed with about 17 parts of tricresyl phosphate.

3. Plastic wall tile as set forth in claim 1 wherein the relative proportions of said calcium carbonate and said polymerizable mix range from 40 to 50 percent by weight of said calcium carbonate and correspondingly from 60 to 50% by weight of said polymerizable mix.

ERNST EGER.

REFERENCES CITED

The following references are of record in the file of this patent:

UNITED STATES PATENTS

| Number | Name | Date |
|---|---|---|
| 2,406,298 | King | Aug. 20, 1946 |
| 2,448,572 | Biggs | Sept. 7, 1948 |